(12) United States Patent
Jinno

(10) Patent No.: US 12,505,570 B2
(45) Date of Patent: Dec. 23, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Takayuki Jinno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 249 days.

(21) Appl. No.: 18/348,230

(22) Filed: Jul. 6, 2023

(65) Prior Publication Data
US 2024/0013420 A1    Jan. 11, 2024

(30) Foreign Application Priority Data
Jul. 7, 2022 (JP) .................. 2022-109788

(51) Int. Cl.
| | | |
|---|---|---|
| *G06T 7/60* | (2017.01) | |
| *G06T 5/80* | (2024.01) | |
| *G06T 7/13* | (2017.01) | |
| *G06T 7/50* | (2017.01) | |

(52) U.S. Cl.
CPC ................. *G06T 7/60* (2013.01); *G06T 5/80* (2024.01); *G06T 7/13* (2017.01); *G06T 7/50* (2017.01); *G06T 2207/10024* (2013.01)

(58) Field of Classification Search
CPC ....................................................... G06T 5/80
See application file for complete search history.

(56) References Cited

U.S. PATENT DOCUMENTS

| | | | |
|---|---|---|---|
| 6,750,958 B1 * | 6/2004 | Fantone ................. | G01B 11/24 356/124 |
| 10,812,735 B2 * | 10/2020 | Hirasawa ............... | H04N 23/55 |
| 2017/0241772 A1 * | 8/2017 | Peng ..................... | G01B 11/24 |
| 2020/0137363 A1 * | 4/2020 | Nakada ................... | H04N 5/74 |

FOREIGN PATENT DOCUMENTS

| | | |
|---|---|---|
| JP | 2003202216 A | 7/2003 |
| JP | 2017173300 A | 9/2017 |
| JP | 2020153759 A | 9/2020 |

OTHER PUBLICATIONS

Hu et al, "Microscopic fringe projection profilometry: A review", Optics and Laser in engineering, 2020, pp. 1-17 (Year: 2020).*

(Continued)

*Primary Examiner* — Edward Park
(74) *Attorney, Agent, or Firm* — Canon U.S.A., Inc. IP Division

(57) ABSTRACT

An image processing apparatus acquires, based on a captured image of an evaluation target object, an optical profile indicating an attribute of an image reflected on a surface of the object. The image processing apparatus also acquires angle information about an angle at each position of the surface of the object relative to an imaging apparatus that captures the image of the object, and corrects the optical profile based on the angle information. The image processing apparatus then acquires an evaluation value indicating a state of the surface of the object based on the corrected optical profile.

13 Claims, 19 Drawing Sheets

(56) References Cited

OTHER PUBLICATIONS

Antensteiner, et al, "A Review of Depth and Normal Fusion Algorithms", Sensors, 2018, pp. 1-24 (Year: 2018).*
Molleda, et al, "On-Line Flatness Measurement in the Steelmaking Industry", Sensors, 2013, p. 10246-10272 (Year: 2013).*
Chen, et al, "Optical 3-D Profilometry for Measuring Semiconductor Wafer Surfaces with Extremely Variant Reflectivities", MDPI, 2019, pp. 1-18 (Year: 2019).*
Hoyo, et al, "Experimental power spectral density analysis for mid- to high-spatial frequency surface error control", Applied Optics, pp. 5258-5267, 2017 (Year: 2017).*
Gioux, et al, "Three-dimensional surface profile intensity correction for spatially modulated imaging", Journal of Biomedical Optics, 2009, pp. 1-11 (Year: 2009).*
Li et al, "An Improved Calibration Method for the Structured Light System Based on Self-correction of Reprojection Error", ACM, Jun. 2022, pp. 1-6 (Year: 2022).*

\* cited by examiner

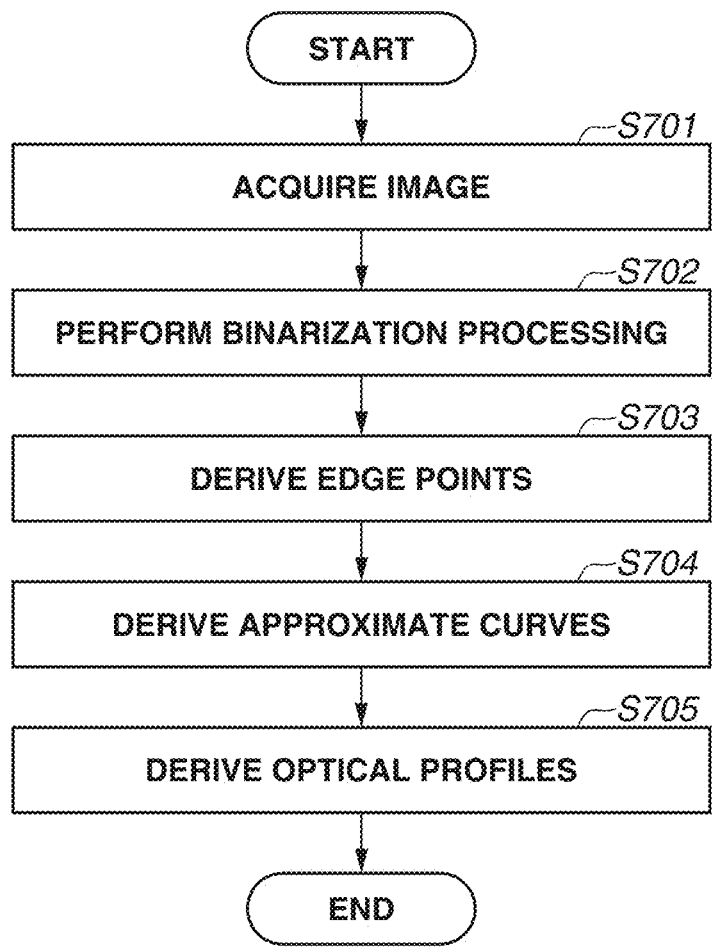

FIG.15

| X-DIRECTION POSITION [pixel] | POSITION ON APPROXIMATE CURVE [mm] | CORRECTED POSITION ON APPROXIMATE CURVE [mm] | PIXEL VALUE (8 bits) |
|---|---|---|---|
| 0 | 0.000 | 0.000 | 82 |
| 1 | 0.239 | 0.253 | 110 |
| 2 | 0.409 | 0.431 | 115 |
| 3 | 0.648 | 0.682 | 158 |
| ... | ... | ... | ... |
| 40 | 10.368 | 10.965 | 98 |
| 41 | 11.782 | 12.470 | 64 |

FIG.18

| $D(x_{i-1}, y_{j-1})$ | $D(x_i, y_{j-1})$ | $D(x_{i+1}, y_{j-1})$ |
|---|---|---|
| $D(x_{i-1}, y_i)$ | $D(x_i, y_j)$ | $D(x_{i+1}, y_i)$ |
| $D(x_{i-1}, y_{i+1})$ | $D(x_i, y_{j+1})$ | $D(x_{i+1}, y_{i+1})$ |

IMAGE PROCESSING APPARATUS, IMAGE PROCESSING METHOD, AND STORAGE MEDIUM

BACKGROUND

Field of the Disclosure

The present disclosure relates to an image processing technique for evaluating the surface state of an object.

Description of the Related Art

In the field of industrial design, it is important to quantitatively evaluate the state of an object surface highly contributing to design and a high-quality feel. For the evaluation, a contact measurement apparatus that measures a one-dimensional reflection intensity profile is commercially available. However, the contact measurement apparatus can evaluate only one line in each measurement and cannot measure a product in a non-contact manner. Japanese Patent Application Laid-Open No. 2017-173300 discusses a technique of using an imaging apparatus to capture an image of a projected pattern reflected on the surface of an evaluation target object, calculating a shape variation of the projected pattern based on the captured image, and evaluating the surface state of the object based on the shape variation and previously-acquired sensory evaluation information.

The technique discussed in Japanese Patent Application Laid-Open No. 2017-173300, however, assumes that the state of the planar surface of an object is evaluated. Thus, in a case where the surface of an object is not planar, the surface state cannot be evaluated with high accuracy.

SUMMARY

The present disclosure is directed to techniques capable of evaluating the surface state of an object even in a case where the surface of the object is not planar.

According to an aspect of the present disclosure, an image processing apparatus includes one or more memories, and one or more processors, wherein the one or more processors and the one or more memories are configured to acquire image data obtained by imaging an object, acquire angle information about an angle at each position of a surface of the object relative to an imaging apparatus that images the object, acquire, based on the image data and the angle information, an optical profile indicating an attribute of an image reflected on the surface of the object, and evaluate a state of the surface of the object based on the optical profile.

Further features of various embodiments of the present disclosure will become apparent from the following description of exemplary embodiments with reference to the attached drawings.

BRIEF DESCRIPTION OF THE DRAWINGS

FIG. 7 is a flowchart illustrating optical profile acquisition processing.

FIG. 15 is a diagram illustrating a relationship among the x-direction position, positions on the approximate curve before and after correction, and a pixel value.

FIG. 18 is a diagram illustrating depth information about a pixel of interest as an angle acquisition target and neighborhood pixels.

DESCRIPTION OF THE EMBODIMENTS

Figure 1A:
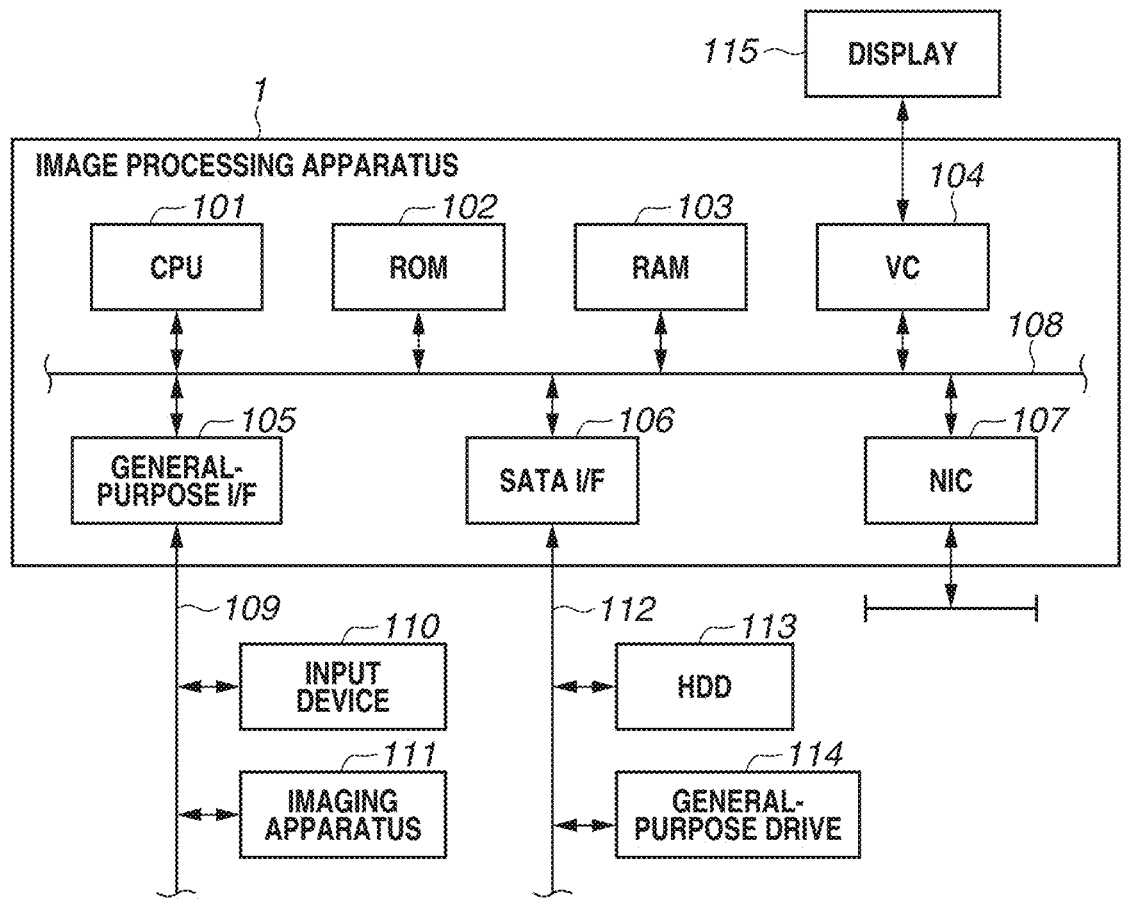
FIGS. 1A and 1B are block diagrams each illustrating a configuration example of an image processing apparatus.

Exemplary embodiments of the present disclosure will be described below with reference to the drawings. The following exemplary embodiments are not intended to limit every embodiment, and all of combinations of features described in the exemplary embodiments are not essential for solving means of the present disclosure. Configurations according to the exemplary embodiments can be appropriately modified or changed depending on the specifications of an apparatus to which any of the exemplary embodiments is applied, and various conditions (e.g., use conditions, use environments). Parts of the exemplary embodiments described below can be appropriately combined. In the following exemplary embodiments, the same components will be described while being denoted by the same reference numerals.

<Evaluation Example of Object Surface State>

In a first exemplary embodiment, image processing performed to evaluate "orange peel" will be described as an example. Orange peel is an example of a state of an object surface contributing to design and a high-quality feel in the field of industrial design.

Orange peel indicates a state where fine irregularities occur on the surface of an object. For example, in coating the body of an automobile, a coating material applied to the body using a spray gun may sometimes be solidified before becoming smooth on the surface of the body. In this case, fine irregularities occur on the surface of the body. This state is called orange peel. The surface of the body is different from an intended smooth and glossy surface, which deteriorates the design and high-quality feel of the automobile. An image processing apparatus 1 (see FIGS. 1A and 1B) according to the present exemplary embodiment derives an evaluation value for evaluating the degree of orange peel on the surface of an evaluation target object, based on a captured image of the surface of the object, and presents the evaluation value to a user, thereby notifying the user of the degree of occurrence of unintended orange peel. The degree of orange peel can be paraphrased as the degree of irregularities on the object surface or the degree of roughness of the object surface. The state of orange peel includes various kinds of irregularities different in period, and the period of the irregularities in the state of orange peel can be expressed as a spatial frequency. In a case where the period of the irregularities of orange peel is large, the spatial frequency is low, whereas in a case where the period of the irregularities is small, the spatial frequency is high. In the present exemplary embodiment, the evaluation value of the surface state of an evaluation target object is acquired based on an image of the object surface captured by an imaging apparatus 111 (see FIG. 1A) (hereinafter also referred to as a captured image). The present exemplary embodiment assumes an example in which orange peel caused by coating is evaluated. Thus, the image processing apparatus 1 derives the evaluation value based on the captured image of an evaluation target object after coating.

In the present exemplary embodiment, as described above, the surface state of an evaluation target object is evaluated using the image of the object captured by the imaging apparatus 111. In a case where the evaluation target object is an object having not a substantially planar surface but a three-dimensional shape, the angle of the object surface relative to the imaging apparatus 111 depends on the position on the object surface. In a case where the angle of the object surface relative to the imaging apparatus 111 depends on the position on the object surface, a shape variation of an image of a projected pattern reflected on the object surface also depends on the position on the object surface. Therefore, the technique discussed in Japanese Patent Application Laid-Open No. 2017-173300 that assumes a planar surface as the object surface, which has been described above, cannot evaluate the surface state of the object.

In the present exemplary embodiment, a configuration and processing of the image processing apparatus 1 capable of evaluating the surface state of an object with high accuracy even in a case where the angle of the object surface relative to the imaging apparatus 111 depends on the position on the object surface will be described.

<Hardware Configuration of Image Processing Apparatus>

FIG. 1A is a block diagram illustrating a hardware configuration example of the image processing apparatus 1 according to the present exemplary embodiment.

The image processing apparatus 1 includes a central processing unit (CPU) 101, a read only memory (ROM) 102, and a random access memory (RAM) 103. The image processing apparatus 1 further includes a video card (VC) 104, a general-purpose interface (I/F) 105, a serial advanced technology attachment (SATA) I/F 106, and a network interface card (NIC) 107. The CPU 101 executes an operating system (OS) and various kinds of programs stored in the ROM 102 or a hard disk drive (HDD) 113 by using the RAM 103 as a work memory. The CPU 101 also controls the components of the image processing apparatus 1 via a system bus 108. Processing in flowcharts (described below) according to the present exemplary embodiment is implemented by the CPU 101 loading program codes stored in the ROM 102 or the HDD 113 into the RAM 103 and executing the program codes. A display 115 is connected to the VC 104. An input device 110, such as a mouse and a keyboard, and the imaging apparatus 111 are connected to the general-purpose I/F 105 via a serial bus 109. The HDD 113 and a general-purpose drive 114 that reads and writes data from and to various kinds of recording media are connected to the SATA I/F 106 via a serial bus 112. The NIC 107 exchanges information with an external apparatus. The CPU 101 uses the HDD 113 and various kinds of recording media mounted on the general-purpose drive 114 as storages of various kinds of data. The CPU 101 displays, on the display 115, a graphical user interface (GUI) 4 (see FIG. 4) provided by a program, and receives instructions input by the user via the input device 110.

<Functional Configuration of Image Processing Apparatus>

Figure 1B:
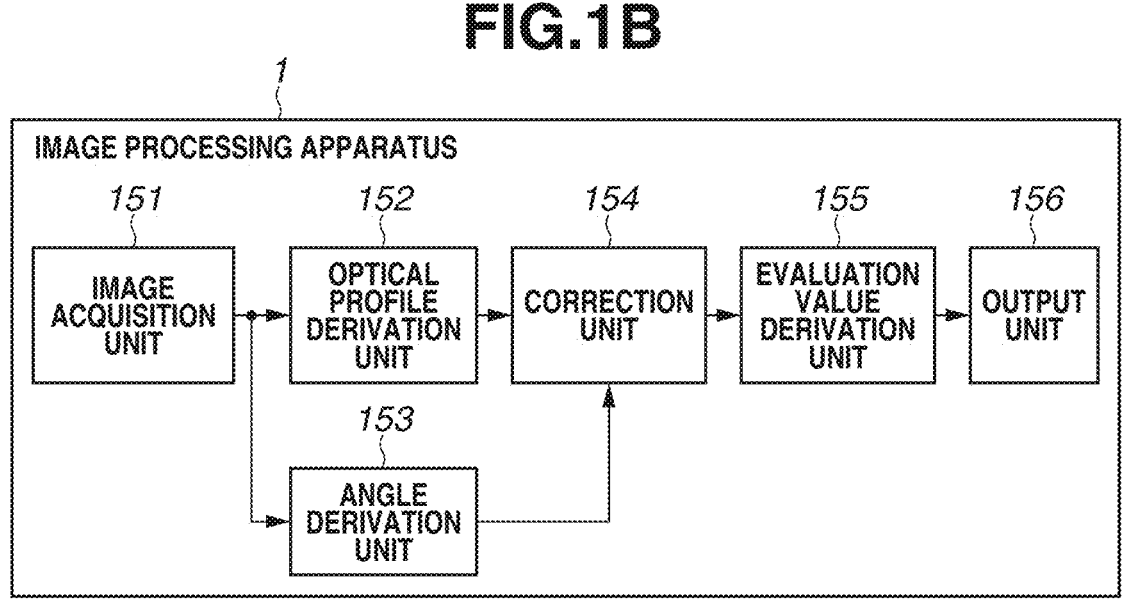

FIG. 1B is a functional block diagram illustrating a functional configuration of the image processing apparatus 1 according to the present exemplary embodiment. The CPU 101 functions as each of functional units illustrated in FIG. 1B by using the RAM 103 as a work memory and reading out and executing the programs stored in the ROM 102 or the HDD 113. All of processing of the functional units (described below) may not necessarily be performed by the CPU 101, and the image processing apparatus 1 can be configured so that a part or all of the processing is performed by one or a plurality of processing circuits other than the CPU 101.

The image processing apparatus 1 includes an image acquisition unit 151, an optical profile derivation unit 152, an angle derivation unit 153, a correction unit 154, an evaluation value derivation unit 155, and an output unit 156.

The image acquisition unit 151 acquires, as captured image data, data of an image of an evaluation target object captured by the imaging apparatus 111. The image data to be acquired by the image acquisition unit 151 is the data obtained by capturing the image of the evaluation target object using the imaging apparatus 111 and stored in advance in the HDD 113 or the like. In the following, the image data will be simply referred to as the "image" except for a case where it is necessary to specifically distinguish and describe them.

Based on the image acquired by the image acquisition unit 151, the optical profile derivation unit 152 performs optical profile acquisition processing (described below) to calculate optical profiles indicating the attributes of an image reflected on the surface of the evaluation target object. The optical profiles indicating the attributes of the image reflected on the surface of the object can be paraphrased as information indicating a change in pixel value depending on the position on the surface of the evaluation target object, in a captured image of a projected image reflected on the surface of the object. In the present exemplary embodiment, a case will be described in which, in a state where the evaluation target object is illuminated, for example, by a linear illumination light source, an image of a projected image of light emitted from the illumination light source and reflected on the surface of the object (hereinafter referred to as an illumination image) is captured. In other words, in the present exemplary embodiment, the optical profile derivation unit 152 acquires the optical profiles indicating the change in pixel value depending on the position on the object surface, in the illumination image included in the captured image.

The angle derivation unit 153 acquires angle information based on the image captured by the imaging apparatus 111.

The angle derivation unit 153 according to the present exemplary embodiment calculates the angle information about an angle at each position of the object surface relative to the imaging apparatus 111, based on the illumination image that is the projected image of the light from the illumination light source in the captured image. Details of angle acquisition processing by the angle derivation unit 153 will be described below.

The correction unit 154 acquires correction values for correcting the optical profiles acquired by the optical profile derivation unit 152, and corrects the optical profiles based on the correction values. In the present exemplary embodiment, the correction unit 154 calculates the correction values for the optical profiles based on the angle information acquired for each position of the object surface by the angle derivation unit 153. Details of correction value acquisition processing based on the angle information and optical profile correction processing using the correction values by the correction unit 154 will be described below.

The evaluation value derivation unit 155 performs evaluation value acquisition processing (described below) to derive evaluation values (orange peel evaluation values in the present exemplary embodiment) from the optical profiles corrected by the correction unit 154.

The output unit 156 outputs the optical profiles corrected by the correction unit 154 and the evaluation values derived by the evaluation value derivation unit 155.

<Operations and Image Processing by Image Processing Apparatus>

Figure 2:
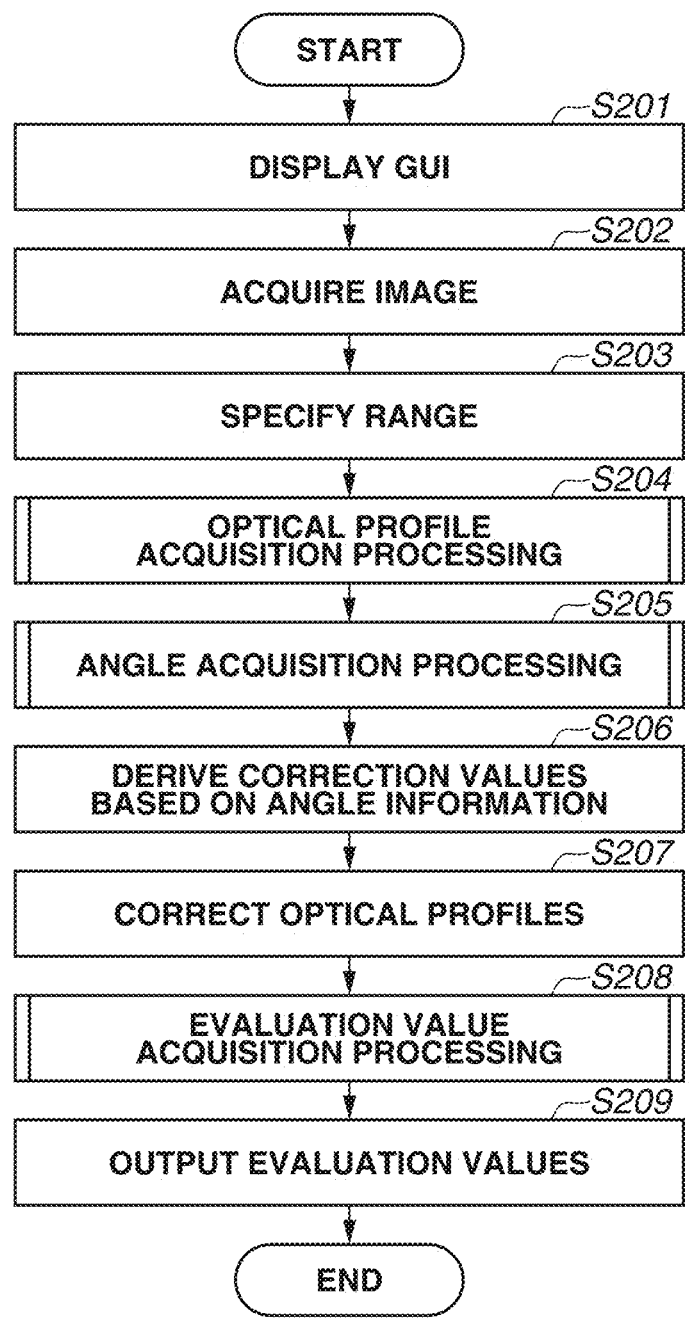
FIG. 2 is a flowchart illustrating image processing performed by the image processing apparatus.

FIG. 2 is a flowchart illustrating operations and image processing performed by the image processing apparatus 1 illustrated in FIGS. 1A and 1B. The image processing apparatus 1 may not necessarily perform all steps in each flowchart to be described below. The order of the steps in each flowchart to be described below can also be changed as appropriate.

In step S201, the CPU 101 displays the GUI 4 illustrated in FIG. 4 (described below) on the display 115 by executing a program stored in the HDD 113. Details of the GUI 4 illustrated in FIG. 4 will be described below.

In step S202, the image acquisition unit 151 acquires a captured image based on an instruction input by the user via the GUI 4 illustrated in FIG. 4 (described below). The image acquired by the image acquisition unit 151 in step S202 is an image of an evaluation target object that is captured by the imaging apparatus 111 using an imaging method illustrated in FIGS. 3A and 3B (described below) and is stored in the HDD 113. In other words, the image acquisition unit 151 acquires the image from the HDD 113 based on the instruction input by the user via the GUI 4 illustrated in FIG. 4.

In step S203, the optical profile derivation unit 152 acquires range specification data indicating an evaluation target area 403 (see FIG. 4) specified in the captured image by the user via the GUI 4 illustrated in FIG. 4 (described below).

In step S204, the optical profile derivation unit 152 calculates the optical profiles in a below-described manner based on an image of the evaluation target area 403 specified in the captured image in step S203.

In step S205, the angle derivation unit 153 derives the angle information about the angle at each position of the object surface relative to the imaging apparatus 111, based on the illumination image that is the projected image of the light from the illumination light source in the captured image. Details of the angle acquisition processing by the angle derivation unit 153 will be described below.

In step S206, the correction unit 154 calculates the correction values based on the angle information derived by the angle derivation unit 153. Details of correction value derivation processing will be described below.

In step S207, the correction unit 154 corrects the optical profiles using the correction values derived in step S206. Details of the optical profile correction processing will be described below.

In step S208, the evaluation value derivation unit 155 calculates the evaluation values (the orange peel evaluation values) based on the optical profiles corrected in step S207. Details of the evaluation value acquisition processing will be described below.

In step S209, the output unit 156 outputs the evaluation values to the display 115.

<Image Capturing Method for Evaluation Target Object>

Figure 3A:
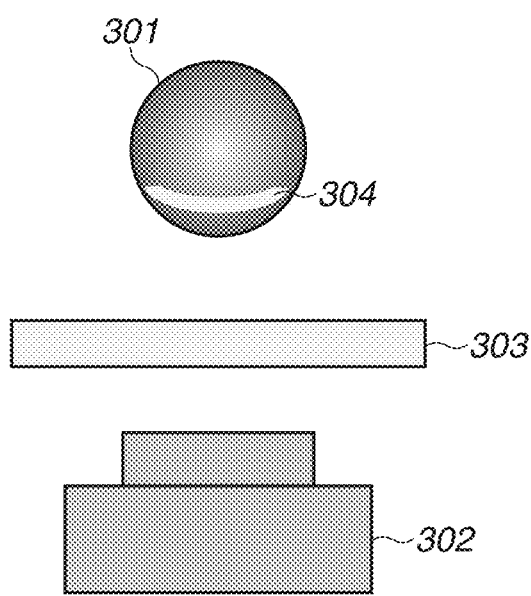
FIGS. 3A and 3B are diagrams schematically illustrating a method for capturing an image of an evaluation target object.
Figure 3B:
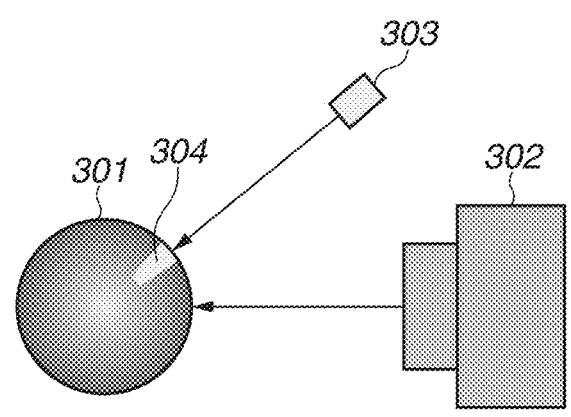

FIGS. 3A and 3B schematically illustrate an example of a method for capturing an image of an evaluation target object. An object 301 is a subject to be imaged by an imaging apparatus 302, and is an evaluation target object according to the present exemplary embodiment. An illumination light source 303 is an illumination light source having a linear (or rectangular) light emission surface, and is installed at a position separated by a certain distance from the object 301 so as not to come into contact with the object 301. The light emission surface of the illumination light source 303 is desirably a diffusion surface. A width in a short-side direction of the rectangular light emission surface of the illumination light source 303 is set to a width considered to be constant irrespective of the position in a long-side direction. The imaging apparatus 302 is, for example, a digital camera and is installed at a position away from the object 301 so as not to come into contact with the object 301. The imaging apparatus 302 corresponds to the imaging apparatus 111 illustrated in FIG. 1A. A distance between the illumination light source 303 and the object 301 and a distance between the imaging apparatus 302 and the object 301 are fixed without being changed. FIG. 3A illustrates a state where the object 301, the imaging apparatus 302, and the illumination light source 303 are observed from directly above, and FIG. 3B illustrates a state where the object 301, the imaging apparatus 302, and the illumination light source 303 are observed from directly beside.

In the imaging method illustrated in FIGS. 3A and 3B, a part of light from the illumination light source 303 is projected onto the surface of the object 301. Accordingly, the light from the illumination light source 303 is reflected as an illumination image 304 on the object surface. The imaging apparatus 302 captures an image of the surface of the object 301 including the illumination image 304. The captured image stored in the HDD 113 described above is the image captured using the imaging method such as that illustrated in FIGS. 3A and 3B.

Since the illumination light source 303 has the rectangular light emission surface, in a case where the surface of the evaluation target object is, for example, planar, edges of the illumination image 304 projected on the object surface have a substantially linear shape. In contrast, in a case where the surface of the evaluation target object has a three-dimensional shape, for example, a curved shape, the edges of the illumination image 304 are lines (e.g., curves) corresponding to the curved shape of the object surface. The example of the three-dimensional shape of the surface of the evaluation target object is not limited to the curved shape, and can be any other shape. In this case as well, the edges of the illumination image 304 projected on the object surface are the lines corresponding to the three-dimensional shape.

Since the object 301 having a spherical shape is used as an example of the evaluation target object in FIGS. 3A and 3B, the edges of the illumination image 304 reflected on the surface of the object 301 are curves. In a case where the surface of the object 301 is smooth, the curves of the edges of the illumination image 304 are also smooth. In contrast, in a case where the surface of the object 301 has irregularities, the edges of the illumination image 304 are jagged lines with distortion. In the present exemplary embodiment, the optical profiles are derived from the state in the vicinity of the edges of the illumination image 304 reflected on the surface of the object 301, and the evaluation values for evaluating the degree of orange peel are derived based on the optical profiles. In the present exemplary embodiment, an example is assumed in which coating is applied to the original smooth surface of the evaluation target object and the evaluation values for evaluation of orange peel on the coated surface of the object are derived.

<GUI>

Figure 4:
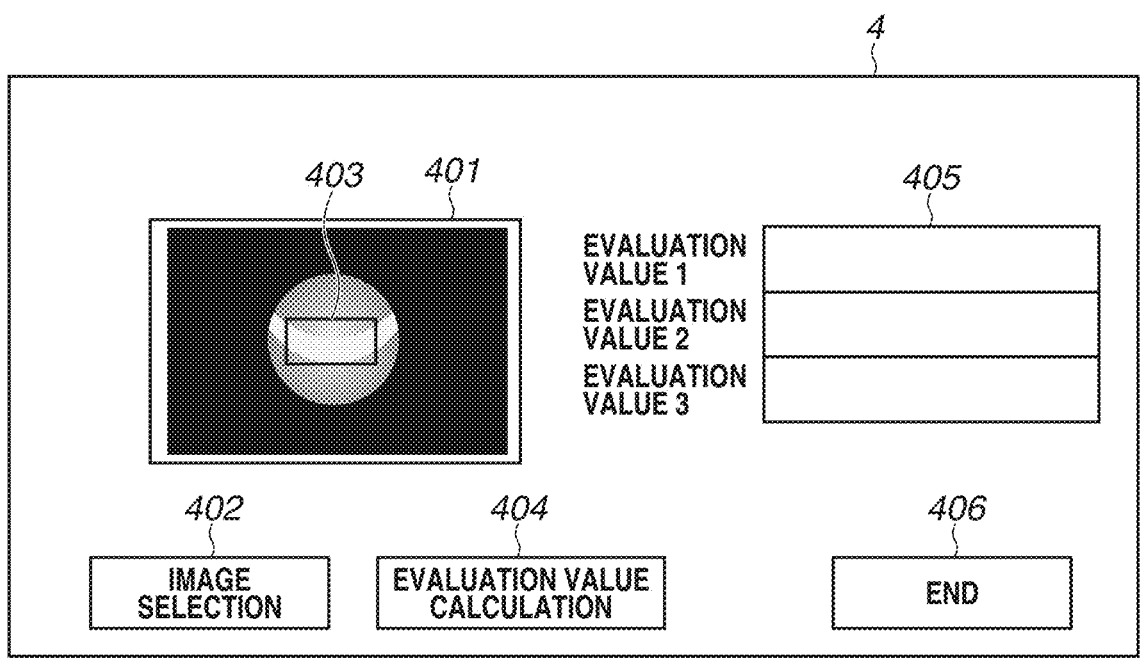
FIG. 4 is a diagram illustrating an example of a graphical user interface (GUI).

FIG. 4 illustrates an example of the GUI 4 displayed on the display 115.

An image display window 401 is a window in which, among the images captured by the imaging apparatus 111 and stored in the HDD 113, an image selected based on a user's instruction is displayed. An image selection button 402 can be pressed by the user to select the image to be displayed in the image display window 401 among the captured images stored in the HDD 113. The evaluation target area 403 is a rectangular area indicating an evaluation range where the orange peel evaluation is performed in the image displayed in the image display window 401. The evaluation target area 403 can be optionally specified by the user. An evaluation value calculation button 404 can be pressed by the user to issue an instruction to perform the evaluation value acquisition processing on the image of the evaluation target area 403. An evaluation value display box 405 is a text box where numerals indicating the calculated evaluation values are displayed. An end button 406 is used by the user to end an image processing program (an image processing application) according to the present exemplary embodiment for evaluation of the state of the object surface.

Figure 5:
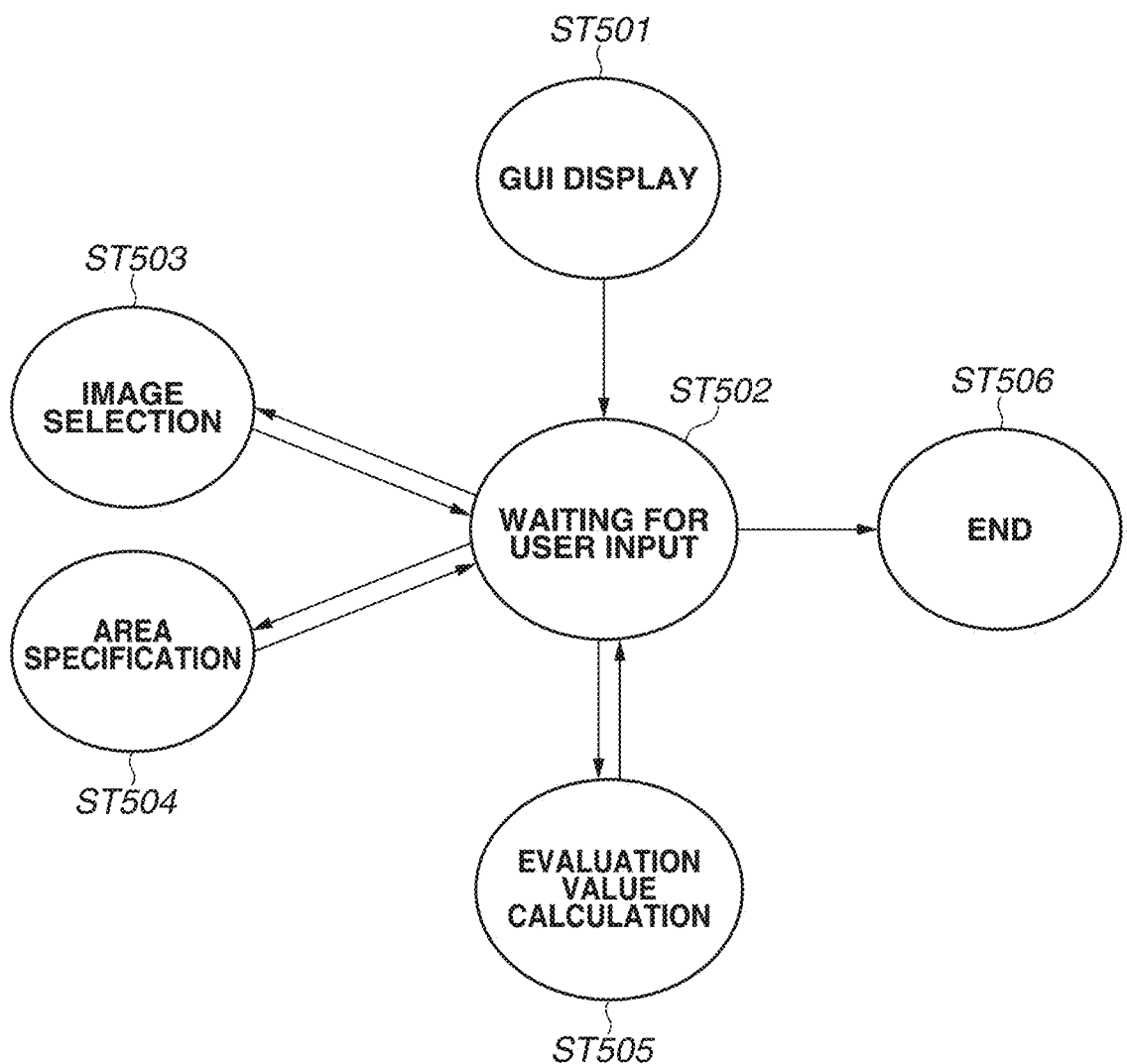
FIG. 5 is a diagram illustrating a state transition in the GUI.

FIG. 5 illustrates a state transition of the image processing apparatus 1 in the example of the GUI 4 according to the present exemplary embodiment illustrated in FIG. 4.

When the image processing application according to the present exemplary embodiment is started up based on an instruction from the user, the image processing apparatus 1 enters a state ST501. After displaying the GUI 4 in the state ST501, the image processing apparatus 1 shifts to a state ST502. In the state ST502, the image processing apparatus 1 waits for an input from the user. For example, if the image selection button 402 is pressed in the state ST502, the image processing apparatus 1 shifts to a state ST503. If the user performs an operation to specify the evaluation target area 403 in the state ST502, the image processing apparatus 1 shifts to a state ST504. If the evaluation value calculation button 404 is pressed in the state ST502, the image processing apparatus 1 shifts to a state ST505. If the end button 406 is pressed in the state ST502, the image processing apparatus 1 shifts to a state ST506.

Upon shifting to the state ST503, the image processing apparatus 1 displays the image selected by the user in the image display window 401, and then shifts to the state ST502.

In a case where the evaluation target area 403 is specified by the user and the image processing apparatus 1 shifts to the state ST504, the image processing apparatus 1 displays the evaluation target area 403 in the image display window 401, and then shifts to the state ST502.

In a case where the image processing apparatus shifts to the state ST505, the image processing apparatus 1 calculates the evaluation values based on the image of the evaluation target area 403, displays the evaluation values in the evaluation value display box 405, and then shifts to the state ST502.

In a case where the image processing apparatus 1 shifts to the state ST506, the image processing apparatus 1 performs an operation to end the image processing application.

Figure 6:
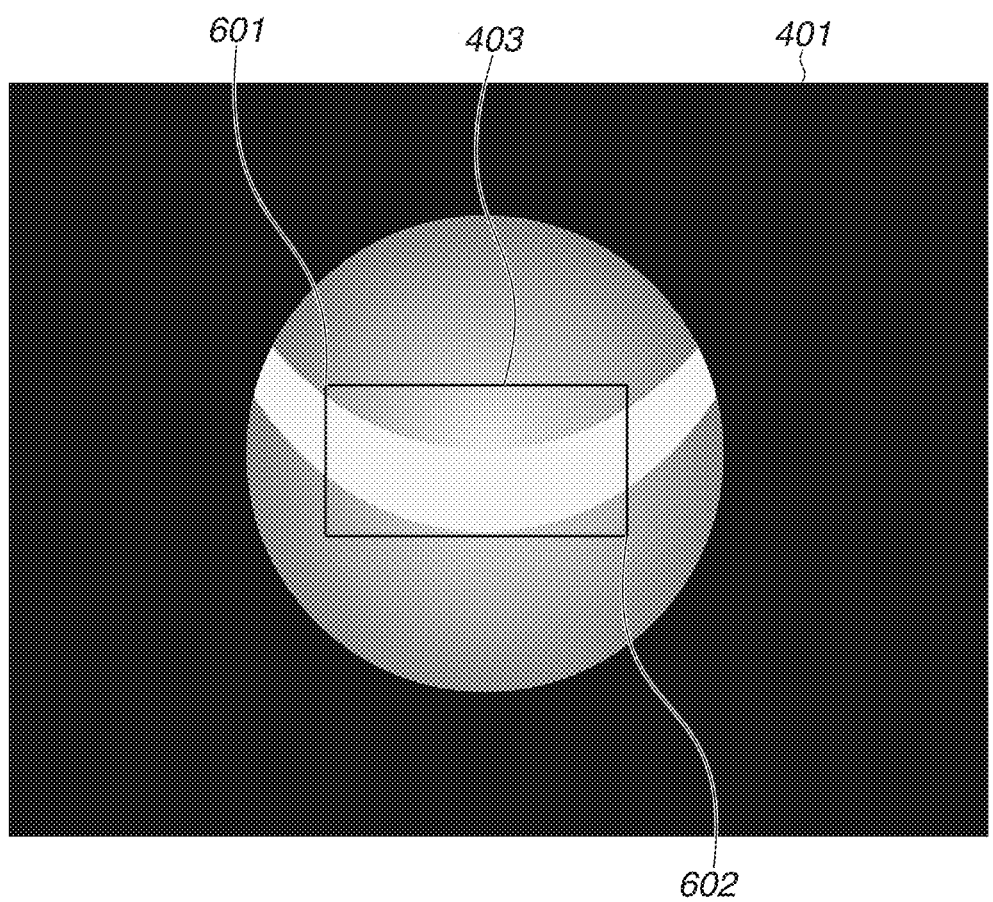
FIG. 6 is a diagram schematically illustrating an evaluation target area in a captured image.

FIG. 6 schematically illustrates the image acquired in step S202 in FIG. 2 and displayed in the image display window 401 of the display 115, and the evaluation target area 403 specified in the image via the GUI 4 illustrated in FIG. 4. The evaluation target area 403 is set by receiving coordinate values of a start point 601 (an upper left pixel) and an end point 602 (a lower right pixel) of the rectangular area (the evaluation target area 403) specified by the user. More specifically, when receiving the coordinate values of the start point 601 and the end point 602 specified by the user, the image processing apparatus 1 sets the evaluation target area 403 so that the start point 601 is the upper left pixel of the rectangular area and the end point 602 is the lower right pixel of the rectangular area. The start point 601 and the end point 602 are specified by the input of the coordinate values via, for example, the input device 110. As described above, the image processing apparatus 1 according to the present exemplary embodiment generates the range specification data indicating the rectangular area (the evaluation target area 403) specified with the start point 601 and the end point 602.

<Optical Profile Acquisition Processing>

FIG. 7 is a flowchart illustrating the details of the optical profile acquisition processing performed by the optical profile derivation unit 152 in step S204 in FIG. 2.

Figure 8A:
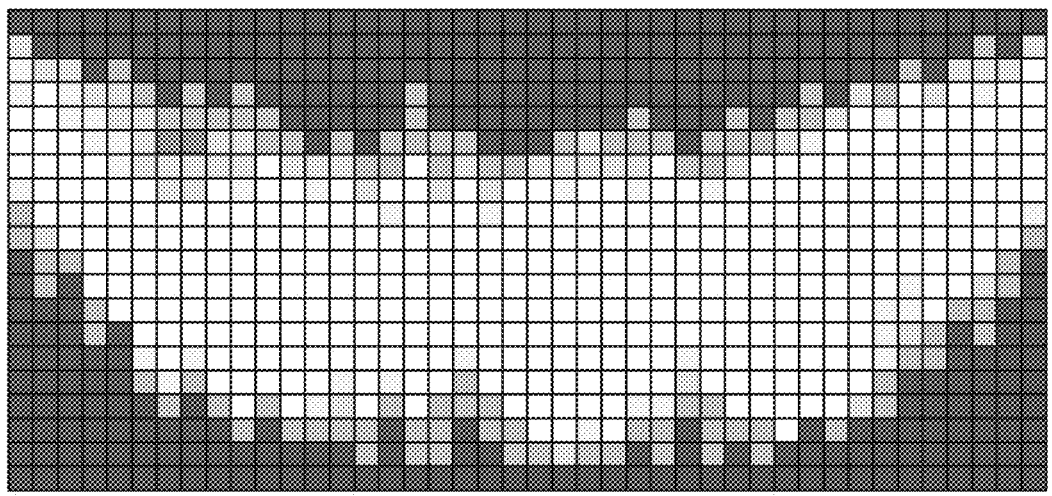
FIG. 8A is a diagram illustrating an example of an image of the evaluation target area.

In step S701, the optical profile derivation unit 152 acquires the image of the evaluation target area 403 from the captured image acquired by the image acquisition unit 151. FIG. 8A illustrates an example of the image of the evaluation target area 403, and each square in FIG. 8A indicates one pixel. In the example of FIG. 8A, white pixels (squares), gray pixels (squares), and black pixels (squares) indicate different pixel values. In the captured image, pixels having higher luminance are drawn with a white color (a light color), and pixels having lower luminance are drawn in such a manner that the color gradually darkens from gray to black as the luminance decreases. In FIG. 8A, a monochrome image is illustrated as an example for illustrative reasons. In the case of a color image, each pixel (each square) becomes bright as the color becomes lighter.

Figure 8B:
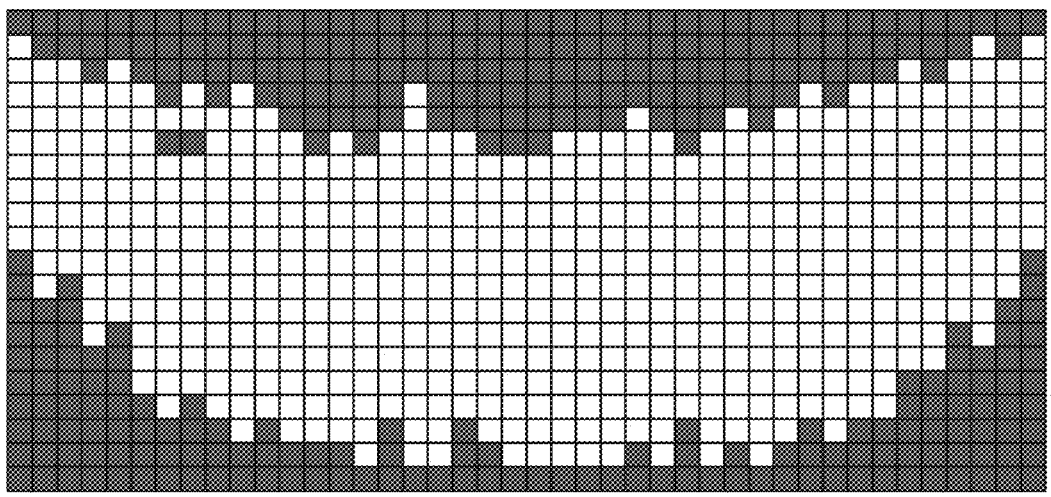
FIG. 8B is a diagram illustrating an example of the image after binarization processing.

In step S702, the optical profile derivation unit 152 binarizes the pixel values of the image of the evaluation target area 403 acquired in step S701. The optical profile derivation unit 152 performs binarization processing on the image of the evaluation target area 403 by using, for example, the known Otsu's binarization method. In the captured image, a gentle luminance gradient can occur depending on the own characteristics of the imaging apparatus 111 and an imaging environment, irrespective of orange peel on the surface of the evaluation target object. In this case, the issue can be avoided by using the known adaptive thresholding. In the case of the binarization processing in step S702, the optical profile derivation unit 152 generates, from the image of the evaluation target area 403, a binarization image in which the pixel values greater than or equal to a threshold are set to 1 (indicating a black pixel)

and the pixel values less than the threshold are set to 0 (indicating a white pixel). FIG. 8B illustrates an image obtained as a result of the binarization processing on the image of the evaluation target area 403 illustrated in FIG. 8A. The image obtained as the result of the binarization processing includes black pixels each having a pixel value of 1 and white pixels each having a pixel value of 0.

In step S703, the optical profile derivation unit 152 detects edges from the image obtained as the result of the binarization processing in step S702. It is assumed here that the x and y coordinates of the start point 601 are $(x_{st}, y_{st})$, and the x and y coordinates of the end point 602 are $(x_{ed}, y_{ed})$. At each of the x values from $x_{st}$ to $x_{ed}$, the optical profile derivation unit 152 searches pixels having the y values from $y_{st}$ to $y_{ed}$, and determines two pixels each having a pixel value different from any of pixel values of adjacent pixels, as points forming the edges (hereinafter referred to as edge points). The adjacent pixels are pixels adjacent in the y direction. For example, the pixels adjacent to a pixel at the coordinates (x, y) are a pixel at the coordinates (x, y−1) and a pixel at the coordinates (x, y+1). For example, if three or more edge points are present with respect to the same x value, the optical profile derivation unit 152 determines the point closest to the value $y_{st}$ and the point closest to the value $y_{ed}$ as the edge points. As a result, in the image of the evaluation target area 403, two edges of a first edge (hereinafter referred to as an upper edge) and a second edge (hereinafter referred to as a lower edge) are detected as the edges including a plurality of edge points.

Figure 9A:
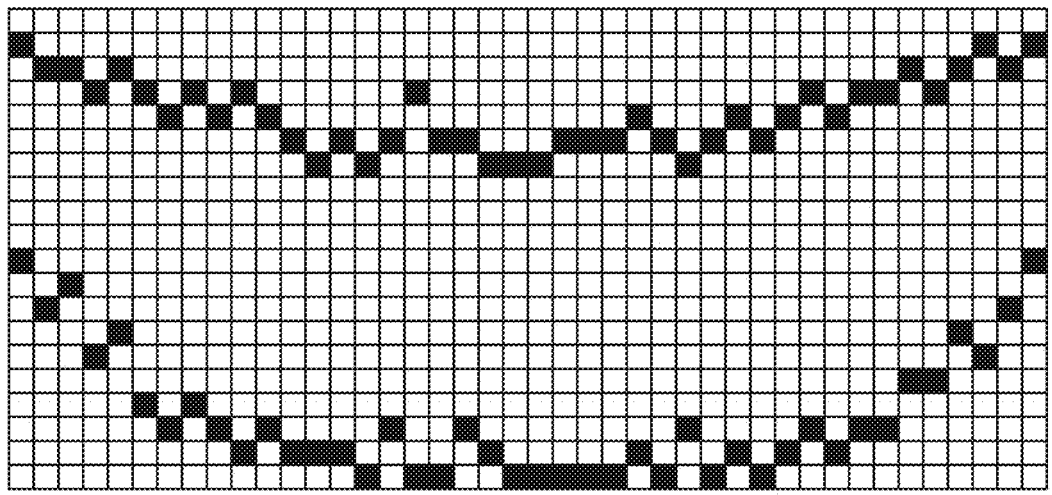
FIG. 9A is a diagram illustrating edge points based on the image of the evaluation target area.

FIG. 9A illustrates the two edges (the upper edge and the lower edge) detected by the processing in step S703 from the image obtained as the result of the binarization processing illustrated in FIG. 8B. In the example of FIG. 9A, the pixels of the edge points are illustrated as black pixels. The optical profile derivation unit 152 performs labeling by adding labels for enabling discrimination between the upper edge and the lower edge, to the pixels of the upper edge and the lower edge.

In step S704, the optical profile derivation unit 152 derives an approximate line (an approximate curve) by approximating each of the upper edge and the lower edge detected in step S703 by a function. The function used to derive the approximate line is not limited as long as the function ensures a smooth change. For example, a polynomial of one variable can be used. In the present exemplary embodiment, a coefficient is derived by the known least-squares method.

Figure 9B:
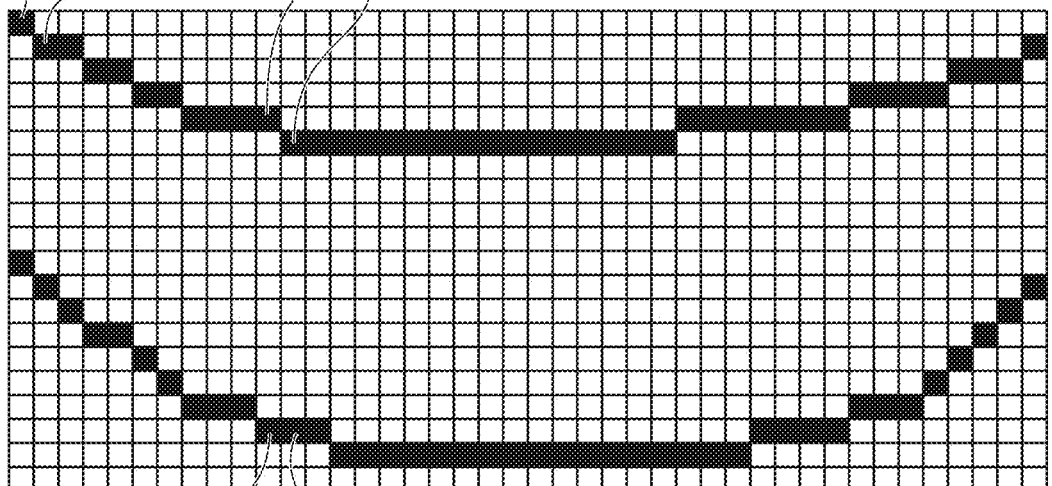
FIG. 9B is a diagram illustrating approximate curves.

FIG. 9B illustrates the approximate curves derived by the processing in step S704 from the upper and lower edges illustrated in FIG. 9A. In the example of FIG. 9B, the pixels on the approximate lines (the approximate curves) are also illustrated as black pixels. The optical profile derivation unit 152 performs labeling processing on the pixels on the approximate curves to enable discrimination between the upper edge approximate curve and the lower edge approximate curve.

In step S705, the optical profile derivation unit 152 derives information about the vicinity of the approximate lines (the approximate curves) derived in step S704, as optical profiles. In the present exemplary embodiment, information about the approximate lines (the approximate curves) is derived as the optical profiles. A sampling interval of each of the optical profiles at this time is derived from the pixel-to-pixel distance of the approximate curve of the same edge.

A method for deriving the sampling interval of the optical profile will be described by using the upper edge approximate curve illustrated in FIG. 9B as an example. To derive the sampling interval of the optical profile, first, the optical profile derivation unit 152 performs a search in a downward direction from the upper left end pixel in FIG. 9B, and sets a first pixel with the label for the upper edge approximate curve as a start point $P_1(1)$ of the upper edge approximate curve. In the example of FIG. 9B, the coordinates of the upper left end pixel are $(x_11, y_11)$, the downward direction from the coordinates of the upper left end pixel is the y direction (the y coordinate direction), and the rightward direction is the x direction (the x coordinate direction). In the example of FIG. 9B, the upper left end pixel is a pixel on the approximate curve (i.e., a black pixel). Thus, the coordinates of the start point $P_1(1)$ is $(x_11, y_11)$. Next, the optical profile derivation unit 152 shifts the search start position by one pixel in the x direction, performs a similar search from the upper end, and sets a first pixel with the label for the upper edge approximate curve as a second point $P_1(2)$. In the example of FIG. 9B, the coordinates of the second point $P_1(2)$ are $(x_12, y_12)$. Thereafter, the optical profile derivation unit 152 similarly performs the search while sequentially shifting the search start position by one pixel in the x direction until the search position in the x direction finally becomes $x_{ed}$. The optical profile derivation unit 152 performs a similar search on the lower edge approximate curve.

When the label indicating any of the upper edge approximate curve and the lower edge approximate curve is denoted by N, a sampling interval $D_N(i)$ between an i-th edge point $P_N(i)$ and an i+1-th edge point $P_N(i+1)$ of the edge approximate curve N is expressed by the following expression (1). In the example of FIG. 9B, the label N indicating the upper edge approximate curve is 1, and the label N indicating the lower edge approximate curve is 2.

$$D_N(i)=(25.4/DPI)\cdot\sqrt{(x_Ni-x_Ni+1)^2+(y_Ni-y_Ni+1)^2} \quad (1)$$

In expression (1), DPI represents a resolution (a sampling pitch at a focal position) of the captured image. In expression (1), the unit of the sampling interval $D_N(i)$ is converted to mm. As described above, each optical profile indicates the information about the vicinity of the approximate curve, and the pixel values on the approximate curve are derived as the optical profile in the present exemplary embodiment. It is desirable that the pixel values be previously subjected to color conversion processing to be converted into a value linear with respect to luminance.

Figure 10:
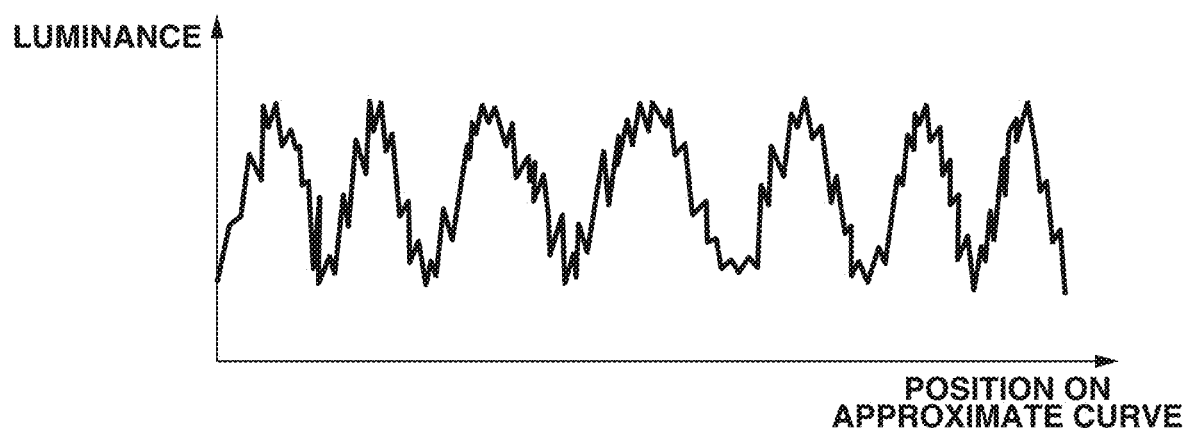
FIG. 10 is a graph illustrating an optical profile corresponding to one of the approximate curves.

FIG. 10 is a graph illustrating an example of data on one of the optical profiles derived by the optical profile derivation unit 152. As illustrated in FIG. 10, the optical profile is derived as a change in luminance value at each position on the approximate curve, namely, as information indicating the change in pixel value depending on the position on the object surface.

<Angle Acquisition Processing>

The angle acquisition processing performed by the angle derivation unit 153 to derive the angle information about the angle at each position of the object surface relative to the imaging apparatus 111 will be described next.

Figure 11:
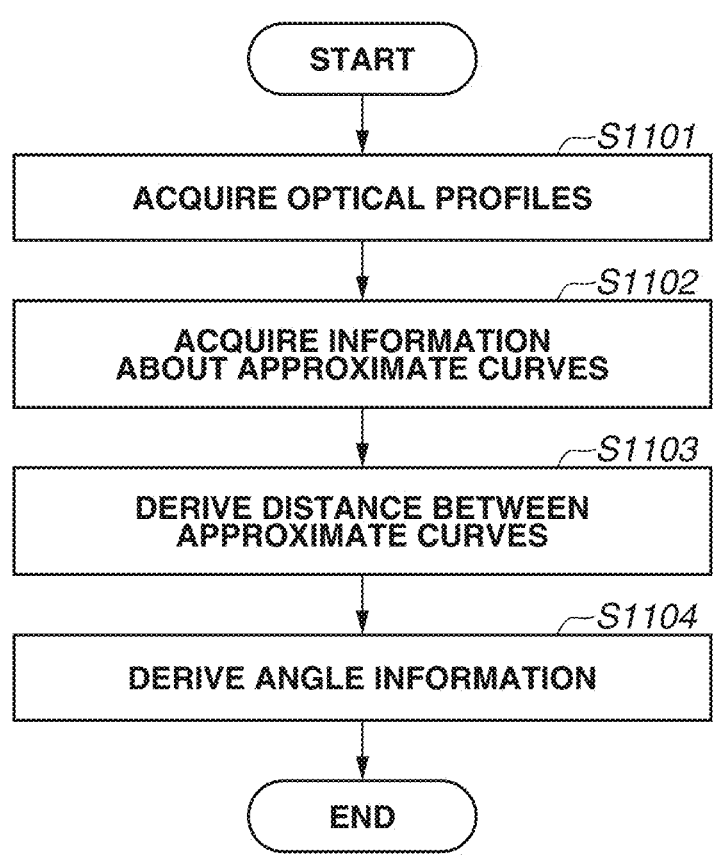
FIG. 11 is a flowchart illustrating angle acquisition processing based on the optical profiles.

FIG. 11 is a flowchart illustrating the details of the angle acquisition processing performed by the angle derivation unit 153 in step S205 in FIG. 2.

In step S1101, the angle derivation unit 153 acquires the optical profiles derived in step S705 described above.

In step S1102, the angle derivation unit 153 acquires the information about the approximate curves derived in step S704 described above. The information about the approximate curves is the information about the upper edge approximate curve and the lower edge approximate curve described above.

In step S1103, the angle derivation unit 153 derives a distance L(i) between the upper edge approximate curve and the lower edge approximate curve based on the information about the approximate curves acquired in step S1102. The distance L(i) between the upper edge approximate curve and the lower edge approximate curve corresponds to a width (in a short-side direction) of the illumination image 304 of the illumination light source 303 reflected on the surface of the object 301. The distance L(i) between the upper edge approximate curve and the lower edge approximate curve is expressed by the following expression (2). Referring to the example of FIG. 9B, $y_1 i$ in the expression (2) is the y-coordinate of the edge point $P_1(i)$ on the upper edge approximate curve, and $y_2 i$ in the expression (2) is the y-coordinate of the edge point $P_2(i)$ on the lower edge approximate curve. In other words, in step S1103, the angle derivation unit 153 derives the distance in the y direction between the pixel on the upper edge approximate curve and the pixel on the lower edge approximate curve at the same x-coordinate.

$$L(i)=y_2 i - y_1 i \quad (2)$$

Figure 12A:
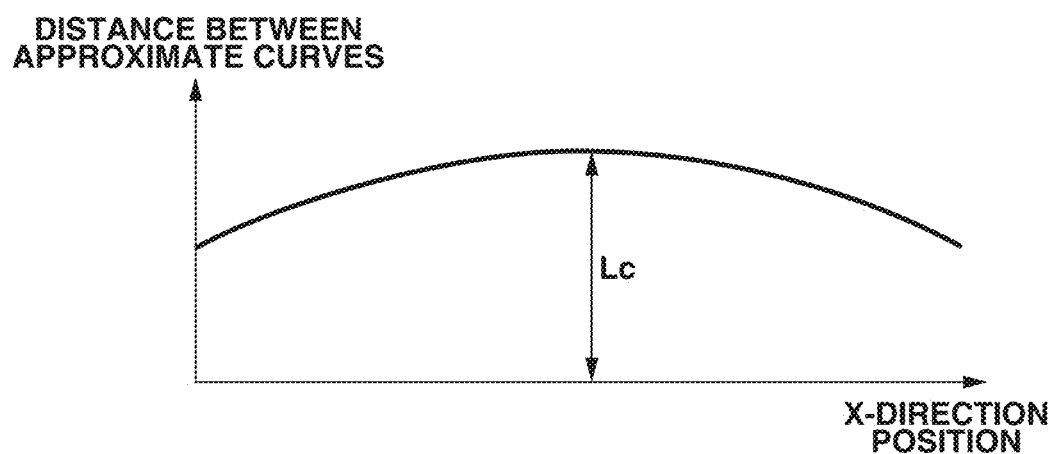
FIG. 12A is a diagram illustrating a width of an illumination image.

In step S1104, the angle derivation unit 153 derives the angle information based on the distance L(i). FIG. 12A is a graph illustrating the distance L(i) at each position in the x direction. In FIG. 12A, Lc represents the distance L(i) between the edge approximate curves at the center coordinates of the image in the x direction. More specifically, in the case of the object 301 having a spherical shape illustrated in FIGS. 3A and 3B, the width of the illumination image 304 in the evaluation target area 403 is narrower at each end portion than at the center portion as illustrated in FIG. 6. Thus, the distance L(i) between the upper edge approximate curve and the lower edge approximate curve is smaller at each end portion than at the center portion. In the graph of FIG. 12A, the distance L(i) between the approximate curves at each end portion is smaller than the distance Lc between the approximate curves at the center coordinates.

Figure 12B:
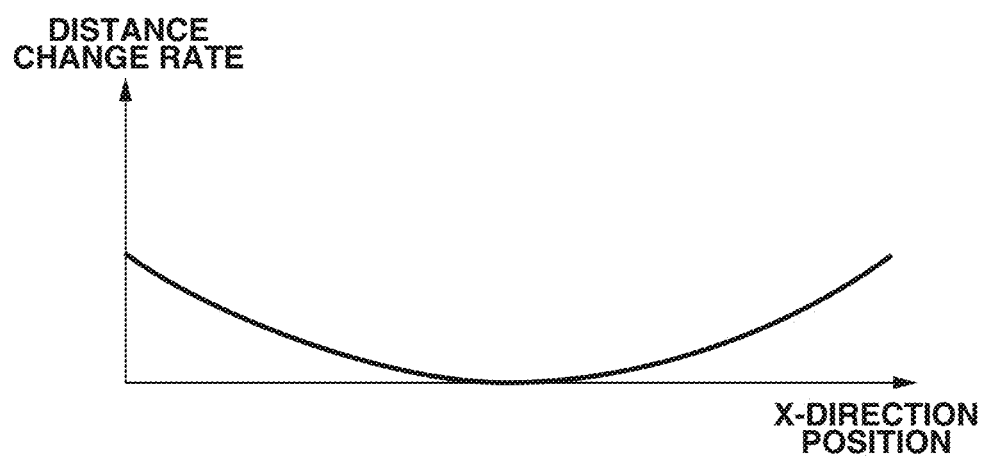
FIG. 12B is a diagram illustrating a change rate of the width of the illumination image.

FIG. 12B is a graph illustrating a change rate of the distance L(i) between the edge approximate curves at each position of the image in the x direction, and plotting values of $R_L(i)$ obtained by the following expression (3). More specifically, in the case of the object 301 having a spherical shape illustrated in FIGS. 3A and 3B, the change rate of the width of the illumination image 304 in the evaluation target area 403 is greater at each end portion than at the center portion. Thus, as illustrated in FIG. 12B, the change rate of the distance L(i) between the edge approximate curves at each position of the image in the x direction increases as the position becomes further away from the center position of the image in the x direction.

$$R_L(i)=|L(i)-Lc|/Lc \quad (3)$$

Figure 13A:
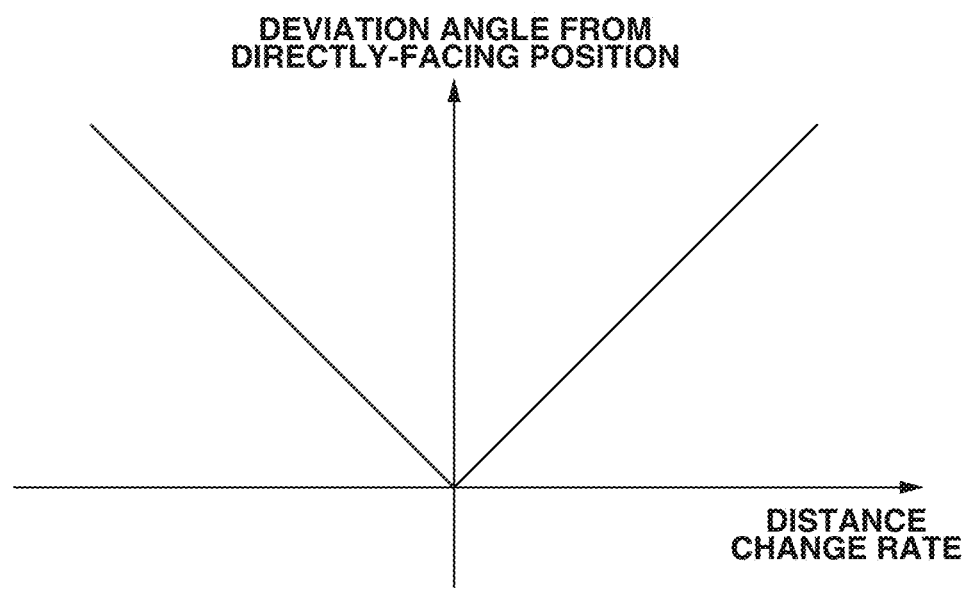
FIGS. 13A and 13B are diagrams illustrating a deviation angle from a directly-facing position with respect to a distance change rate and an x-direction position, respectively.
Figure 13B:
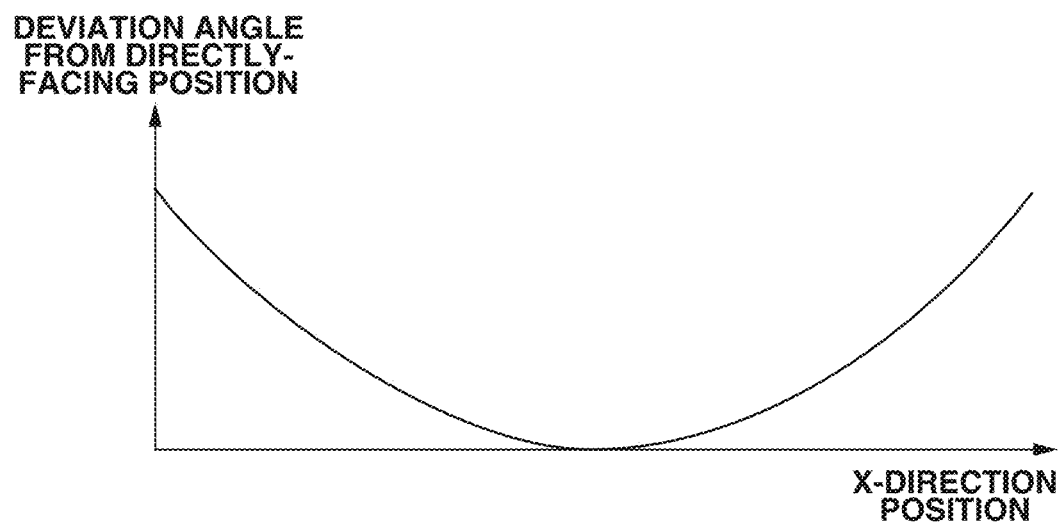

FIG. 13A is a graph illustrating a correspondence relationship between the change rate of the distance L(i) (the distance change rate) at each position in the x direction illustrated in FIG. 12B and a deviation angle from the angle at the position where the imaging apparatus 111 directly faces the object surface. In the present exemplary embodiment, the angle derivation unit 153 stores information indicating the correspondence relationship illustrated in FIG. 13A, as a lookup table. The angle derivation unit 153 converts the distance change rate illustrated in FIG. 12B into the deviation angle from the angle at the directly-facing position by using the lookup table. FIG. 13B is a graph illustrating the deviation angle at each position in the x direction obtained by converting the distance change rate into the deviation angle. In this manner, the angle derivation unit 153 acquires angle data obtained by converting the distance change rate illustrated in FIG. 12B into the deviation angle from the angle at the directly-facing position by using the lookup table storing the correspondence relationship illustrated in FIG. 13A, as the angle information about the angle at each position in the x direction.

<Correction Value Derivation Processing Based on Angle Information>

The correction value derivation processing performed by the correction unit 154 to derive the correction values for the optical profiles based on the angle information derived by the angle derivation unit 153 will be described next.

In step S206 in FIG. 2 described above, the correction unit 154 derives a correction value C(i) using the following expression (4) and the angle information (the deviation angle from the directly-facing position) derived for each position (each edge point position i) in step S205.

$$C(i)=1/\cos \theta(i) \quad (4)$$

<Optical Profile Correction Processing>

The optical profile correction processing by the correction unit 154 will be described next.

In step S207 in FIG. 2, the correction unit 154 performs correction processing on the optical profiles derived in step S705 to change the sampling interval $D_N(i)$. At this time, the correction unit 154 determines a corrected sampling interval $D_N'(i)$ using the following expression (5) and the above-described correction value C(i).

$$D_N'(i)=C(i) \cdot D_N(i)=D_N(i)/\cos \theta(i) \quad (5)$$

Figure 14:
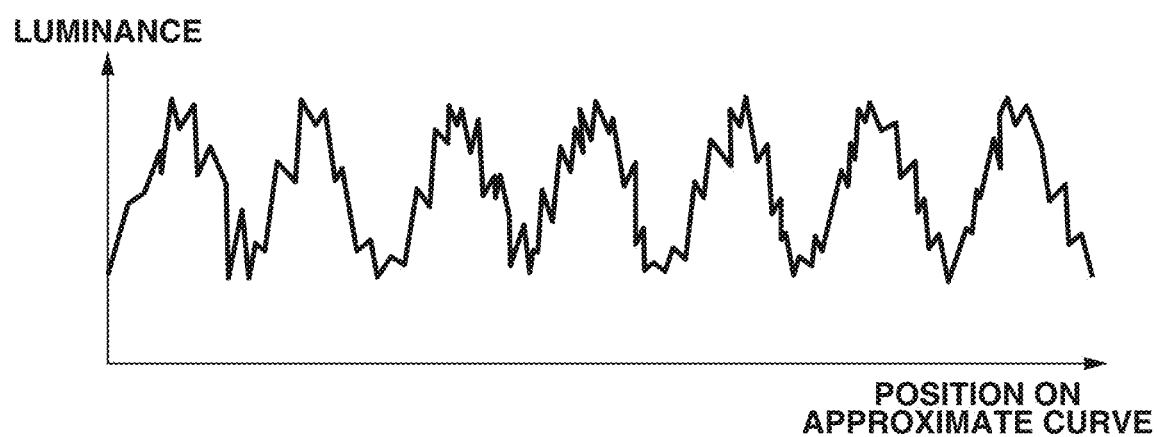
FIG. 14 is a graph illustrating a corrected optical profile.

FIG. 14 is a graph illustrating an example of data after the optical profile illustrated in FIG. 10 is corrected using the corrected sampling interval $D_N'(i)$. It is found from a comparison between the data on the optical profile before the correction illustrated in FIG. 10 and the data on the optical profile after the correction illustrated in FIG. 14 that the sampling interval at each end portion in the x direction, which is narrow in FIG. 10, is widened in FIG. 14. In the case of an object having a spherical shape like the object 301, the angle relative to the imaging apparatus 111 increases as the position on the surface is farther away from the center, and the period of the surface irregularities observed from the imaging apparatus 111 reduces. Thus, the spatial frequency of the optical profile before the correction illustrated in FIG. 10 is higher at each end portion than at the center portion. In contrast, in the present exemplary embodiment, the sampling interval of each of the optical profiles is corrected based on the angles of the object surface relative to the imaging apparatus 111. Thus, the spatial frequency at each end portion and the spatial frequency at the center portion are substantially equal to each other as illustrated in FIG. 14. In other words, according to the present exemplary embodiment, the optical profile state of the illumination image 304 that varies depending on the position on the object surface due to the difference in the angle of the object surface relative to the imaging apparatus 111 depending on the position on the object surface is corrected. FIG. 15 is a table illustrating data indicating relationships among the x-direction positions, the positions on the edge approximate curve, the corrected positions on the edge approximate curve, and the pixel values, regarding the upper edge obtained from the image illustrated in FIG. 8A. In other words, the optical profile in FIG. 14 is data on the pixel values at the corrected positions on the edge approximate curve illustrated in FIG. 15.

<Evaluation Value Acquisition Processing>

The evaluation value acquisition processing in step S208 in FIG. 2 will be described next.

Figure 16:
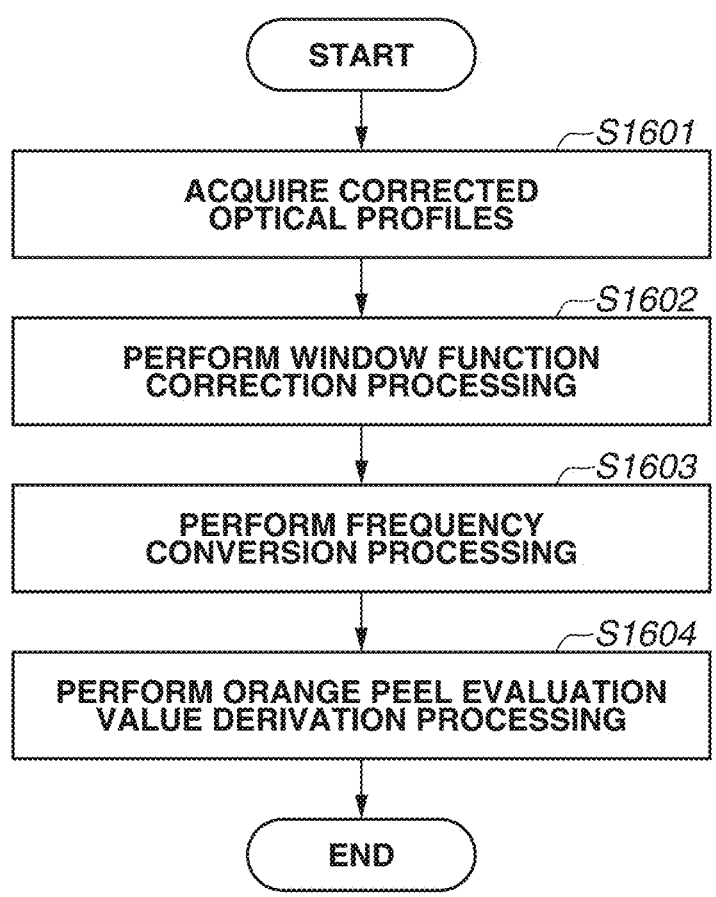
FIG. 16 is a flowchart illustrating evaluation value acquisition processing.

FIG. 16 is a flowchart illustrating the evaluation value acquisition processing performed by the evaluation value derivation unit 155.

In step S1601, the evaluation value derivation unit 155 acquires the optical profiles corrected by the correction unit 154.

In step S1602, the evaluation value derivation unit 155 performs window function correction processing on the corrected optical profiles. The type of window function is not limited, but the known Hanning window is used in the present exemplary embodiment.

In step S1603, the evaluation value derivation unit 155 performs the known Fourier transform processing for frequency conversion.

Figure 17:
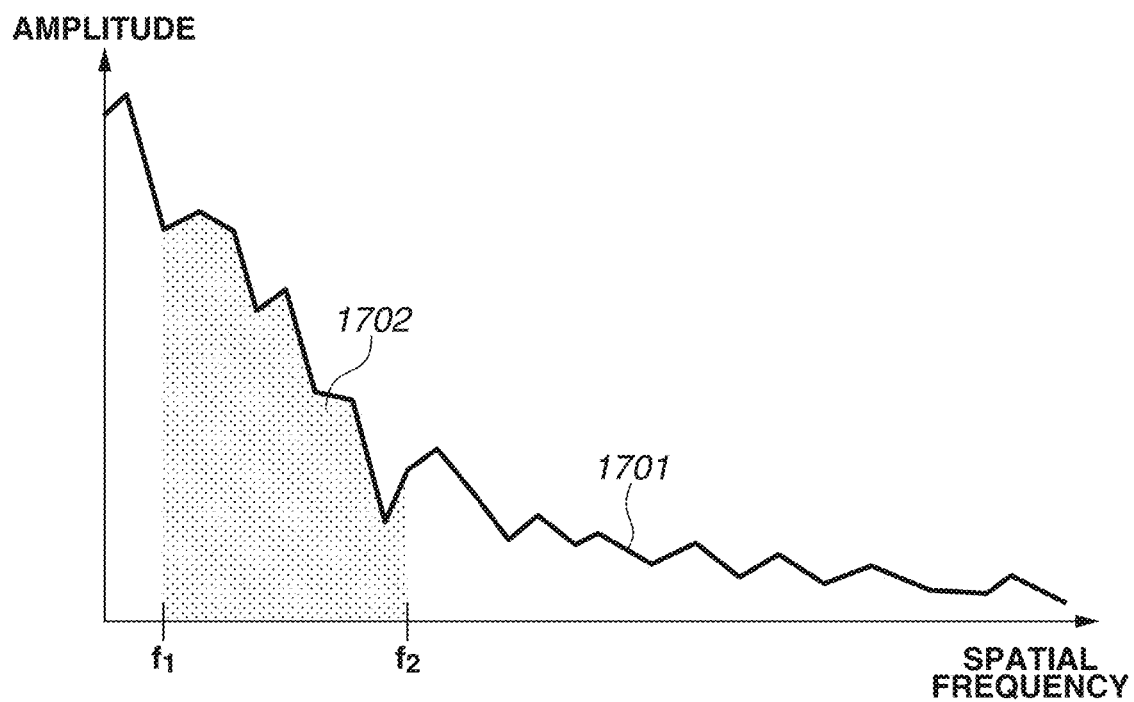
FIG. 17 is a diagram illustrating spatial frequency characteristics of the optical profile.

FIG. 17 illustrates spatial frequency characteristics 1701 that are obtained by applying the window function to the corrected optical profile illustrated in FIG. 14 in step S1602 and further performing the Fourier transform processing in step S1603.

In step S1604, the evaluation value derivation unit 155 derives an evaluation value W by performing an integration operation on a predetermined frequency section using the following expression (6).

$$W = \Sigma_{f_1}^{f_2} \operatorname{amp} \Delta f \qquad (6)$$

In the expression (6), W represents the evaluation value, amp represents the spatial frequency characteristics 1701 determined based on the corrected optical profile, $f_1$ represents the lower limit of an integration section, $f_2$ represents the upper limit of the integration section, and $\Delta f$ represents a pitch width of the frequency. An area 1702 illustrated in FIG. 17 indicates an integration area corresponding to the evaluation value W. For example, the predetermined frequency section is set so that the lower limit $f_1$ is 0.1 cycles/mm and the upper limit $f_2$ is 1.0 cycles/mm. The section can be set by specifying a desirable frequency and can also be set in plural. Alternatively, in consideration of spatial frequency characteristics of vision, the evaluation value derivation unit 155 can derive the evaluation value W by multiplying the spatial frequency characteristics amp in the expression (6) by a weight coefficient corresponding to vision sensitivity for each frequency.

In the present exemplary embodiment, the optical profiles corresponding to the two edges (i.e., the upper edge and the lower edge) are derived. Thus, the evaluation value derivation unit 155 derives the evaluation values respectively corresponding to the two edges. Alternatively, the evaluation value derivation unit 155 can derive the average of the evaluation values of the upper edge and the lower edge for each integration section, as the evaluation value, or can derive the evaluation value of each of the edges without performing averaging processing.

As described above, the image processing apparatus 1 according to the present exemplary embodiment enables, even in a case where an object that has a three-dimensional shape, such as a curved surface, and is imaged with a different angle depending on the position on the object surface is to be evaluated, acquiring the evaluation values of the surface while suppressing accuracy deterioration.

In the first exemplary embodiment, the example has been described in which, to accurately evaluate the surface state (the degree of orange peel) of an object having a three-dimensional shape, such as a curved surface, the angles of the object surface are derived from the change rate of the width of the reflected illumination image of the illumination light source, and the optical profiles are corrected based on the derived angles.

In a second exemplary embodiment, an example of enabling the evaluation even in a case where a plurality of illumination light beams is simultaneously projected onto the object surface and the surface state is evaluated using a plurality of illumination images in order to improve efficiency of the evaluation, or in a case where only one edge on either side is imaged unlike the first exemplary embodiment, will be described. In the present exemplary embodiment, an example will be described in which depth information about the evaluation target object is used to derive the angle at each position of the object surface and evaluate orange peel. A configuration of an image processing apparatus according to the present exemplary embodiment is similar to the configuration according to the first exemplary embodiment. Thus, components and processing similar to those according to the first exemplary embodiment will be denoted by the same reference numerals, and the description thereof will be omitted. In the following, a difference from the first exemplary embodiment will mainly be described. In the present exemplary embodiment, angle acquisition processing for optical file correction will be described in detail as the difference from the first exemplary embodiment.

<Angle Acquisition Processing>

In the present exemplary embodiment, two edge approximate curves, such as those illustrated in the first exemplary embodiment, may not necessarily be used. The present exemplary embodiment is also applicable to a case where a plurality of illumination light beams is simultaneously projected onto the object surface in order to improve efficiency of the evaluation, for example, a case where illumination light having a stripe pattern is projected to obtain three or more edge approximate curves. In the present exemplary embodiment, the depth information about the evaluation target object is used to derive the angle information about the angle at each position of the object surface. As a technique for acquiring the depth information, a technique discussed in D. Kwak and S. Lee, "A Novel Method for Estimating Monocular Depth Using Cycle GAN and Segmentation", Sensors 2020, 20(9), 2567 can be used. D. Kwak and S. Lee, "A Novel Method for Estimating Monocular Depth Using Cycle GAN and Segmentation", Sensors 2020, 20(9), 2567 discusses a technique for estimating depth information from a captured image by using a method called a cycle generative adversarial network (GAN).

In the present exemplary embodiment, in step S204 in FIG. 2, the optical profile derivation unit 152 derives the optical profiles in the above-described manner. The optical profile derivation unit 152 further acquires the depth information about the object from the captured image by using the technique discussed in D. Kwak and S. Lee, "A Novel Method for Estimating Monocular Depth Using Cycle GAN and Segmentation", Sensors 2020, 20(9), 2567. The technique for estimating the depth information about the object from the captured image is not limited to the cycle GAN, and any other applicable technique, such as a technique for estimating the depth information by using machine learning, can be used. Further, the acquisition of the depth information is not limited to the acquisition using the estimation processing, and the depth information can be acquired from three-dimensional computer aided design (CAD) information that is design information about the three-dimensional shape of the evaluation target object.

FIG. 18 illustrates an example of the acquired depth information. Assuming that the depth of a pixel of interest $(x_i, y_i)$ as an angle derivation target is $D(x_i, y_i)$, FIG. 18 illustrates the depth information about eight pixels neighboring the pixel of interest $(x_i, y_i)$. The normal vector of the pixel of interest $(x_i, y_i)$ can be derived from the cross product of a vector formed by $(x_i, y_i, D(x_i, y_i))$ and $(x_i, y_{i-1}, D(x_i, y_{i-1}))$ and a vector formed by $(x_i, y_i, D(x_i, y_i))$ and $(x_{i+1}, y_i, D(x_{i+1}, y_i))$. Alternatively, a plurality of normal vectors of the pixel of interest $(x_i, y_i)$ can be determined using vectors with the other neighboring pixels, and the average vector of the plurality of normal vectors can be determined as the normal vector of the pixel of interest $(x_i, y_i)$. It is assumed that an angle formed by the derived normal vector and the object surface at the position directly facing the imaging apparatus 111 is defined as a deviation angle $\theta(i)$. The deviation angle $\theta(i)$ is used as the angle information for correcting the sampling interval of each of the optical profiles in a manner similar to the above-described first exemplary embodiment.

As described above, the image processing apparatus 1 according to the present exemplary embodiment can acquire the angle information about the angle at each position of the object surface by using the depth information about the object without using the two edge approximate curves as in the first exemplary embodiment. Thus, even in a case where the object is imaged with a different angle depending on the position on the object surface, the image processing apparatus 1 according to the present exemplary embodiment can evaluate the surface state while suppressing accuracy deterioration. In other words, according to the present exemplary embodiment, even in a case where a plurality of illumination light beams is simultaneously applied for evaluation, or in a case where only one edge is imaged, the surface state can be evaluated.

MODIFICATION EXAMPLES

While in the above-described exemplary embodiments, the optical profiles in a lateral direction are derived from the illumination image of the light emitted from the laterally-long illumination light source and reflected on the surface of the evaluation target object, the illumination light source can be vertically long. In this case, the optical profiles in a vertical direction can be derived from an illumination image of light emitted from the vertically-long illumination light source and reflected on the surface of the object.

In the above-described exemplary embodiments, the optical profiles in a predetermined direction (e.g., a lateral direction or a horizontal direction) of the image are derived. However, the edge approximate curves can be inclined relative to the horizontal direction depending on, for example, the positional relationship between the light source and the object, and the shape of the object. In this case, a predetermined angle threshold relative to the horizontal direction can be set in advance, and in a case where any of the edge approximate curves exceeds the threshold, the image processing apparatus 1 can determine that processing is not possible and can provide a predetermined notification to the user. As the predetermined notification to the user, a message can be displayed or a sound can be output to indicate that processing is not possible.

Alternatively, the image processing apparatus 1 can determine an inclination relative to an evaluation target area by using the illumination image reflected on the object surface, and can derive the width of the illumination image in a direction orthogonal to the determined inclination.

Figure 19:
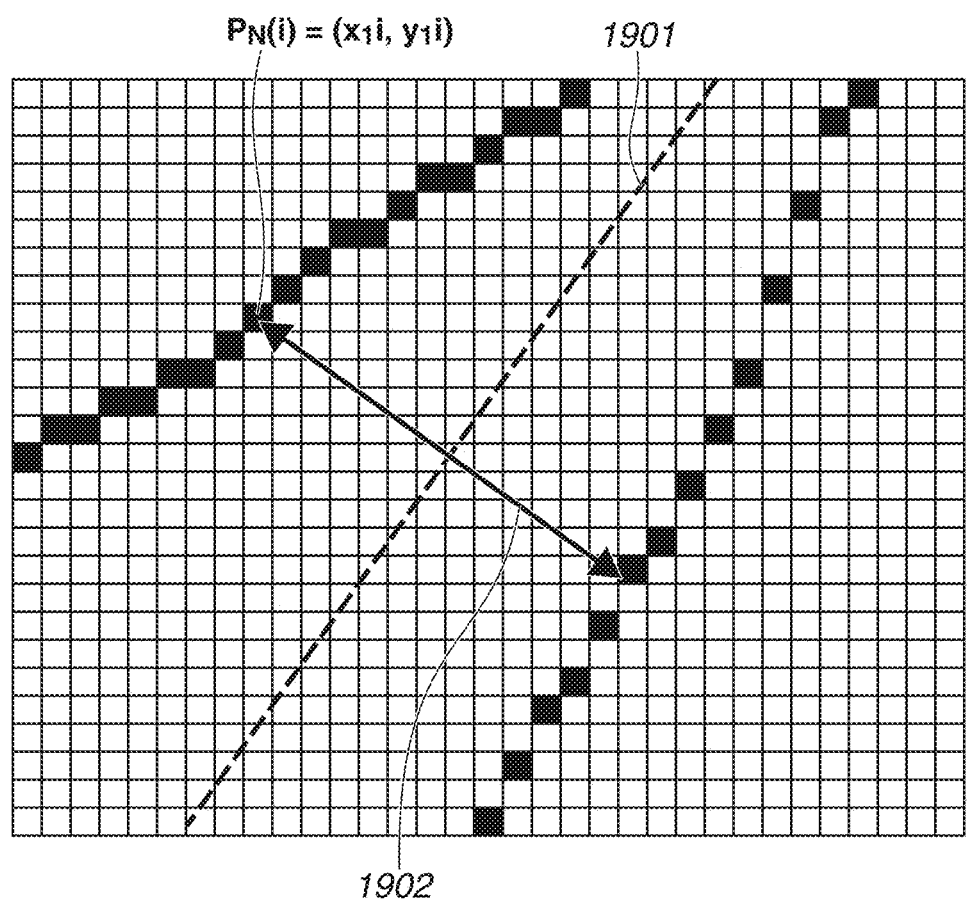
FIG. 19 is a diagram illustrating approximate curves of edge points according to a second exemplary embodiment.

FIG. 19 illustrates an example of the edge approximate curves determined from the illumination image having an inclination, in a manner similar to the example illustrated in FIGS. 8A and 8B and FIGS. 9A and 9B. The black pixels illustrated in FIG. 19 indicate the edge approximate curves. In FIG. 19, a straight line 1901 passes through a substantially center portion between the two edges. In this example, the angle derivation unit 153 further linearly approximates each of the edge approximate curves, and derives the straight line 1901 as a center line of the two line segments. The angle derivation unit 153 further performs a search from each edge point $P_N(i)$ on one of the edge approximate curves in a direction orthogonal to the straight line 1901 to determine the distance to an intersection with the other edge approximate curve, as a width 1902 of the illumination image. In the example of FIG. 19, the angle derivation unit 153 derives the distance change rate at each position based on a distance between a first intersection with one of the edge approximate curves and a second intersection with the other edge approximate curve in the direction orthogonal to the center line, at each position on the center line. The angle derivation unit 153 then acquires the angle information based on the distance change rate in the above-described manner.

While in the above-described exemplary embodiments, the method for deriving the angle information from the captured image has been described, the angle derivation unit 153 can acquire the angle information that is derived separately in advance.

While in the above-described exemplary embodiments, the optical profiles are derived using the information about the vicinity of the edges, the optical profile derivation unit 152 can acquire the optical profiles using not the information about the vicinity of the edges but information about an area between the edges.

While in the above-described exemplary embodiments, the luminance information on the edge approximate curves is used as the optical profiles, the optical profiles are not limited to the luminance information, and distance information based on the distances between the edge approximate curves and the edge points can be used as the optical profiles.

While in the above-described exemplary embodiments, the image acquisition unit 151 acquires the image data from the HDD 113, the image acquisition unit 151 can acquire the image data directly from the imaging apparatus 111.

While in the above-described exemplary embodiments, the illumination image 304 is generated on the object 301 by using the illumination light source 303, the illumination condition in the imaging is not limited to the above-described example. For example, a line light source having directivity can be used as the illumination light source 303 to project the illumination image 304 onto the surface of the object 301. In this case, edges of an area illuminated by strong right from the line light source can be used. The linear illumination light can be, for example, illumination light formed in a linear shape by using a shield or the like, or linear illumination light having passed through an optical system having a slit shape.

While in the above-described exemplary embodiments, the user specifies the positions of the start point 601 and the end point 602 of the straight line to determine the evaluation target area 403, the information specified by the user is not limited to the above-described example. For example, the user can specify four apexes of the evaluation target area 403. Further, the points determining the evaluation target area 403 are not limited to the input of the coordinate values.

For example, the evaluation target area 403 can be specified by a straight line drawn on the image in the image display window 401 by the user via the input device 110.

While in the above-described exemplary embodiments, the range specification data indicating the evaluation target area 403 is acquired, the range specification data may not necessarily be acquired. For example, a range predetermined in the image can be set as the evaluation target area 403, or the entire image can be set as the evaluation target area 403.

While in the above-described exemplary embodiments, the edges are detected by determining, as the edge points, pixels each having a pixel value different from any of the pixel values of the adjacent pixels in the y direction, the edge detection method is not limited thereto. For example, an edge detection method that secondarily differentiates the image and determines points at which the output value changes from plus to minus (or minus to plus), namely, inflection points as the edge points can be used.

While in the above-described exemplary embodiments, the derived evaluation values are displayed on the display 115, the evaluation value output method is not limited thereto. For example, the derived evaluation values can be stored in a storage device, such as the HDD 113. At this time, coating information about a coating environment and a coating method in coating the object can also be stored in a storage device such as the HDD 113, in association with the evaluation values. In this case, the coating information and the corresponding evaluation values are read out from the storage device and are displayed as, for example, a list, whereby the user can easily know the coating method and the coating environment hardly causing orange peel.

While in the above-described exemplary embodiments, the input device 110 and the display 115 are provided as separated devices, a touch panel display in which the input device 110 and the display 115 are combined can be used instead.

While in the above-described exemplary embodiments, the image processing apparatus 1 performs the evaluation using the captured image as a still image, the image processing apparatus 1 can use a moving image and perform the evaluation for each frame of the moving image.

While in the above-described exemplary embodiments, the correction unit 154 corrects the optical profiles, the correction unit 154 can correct the captured image data acquired by the image acquisition unit 151, and generate the optical profiles based on the corrected captured image data. The correction unit 154 corrects the captured image data so as to obtain the optical profiles each having the sampling interval illustrated in FIG. 14, based on the angle information derived by the angle derivation unit 153. In this manner, correcting not the optical profiles but the captured image data makes it possible to achieve effects similar to those of the above-described exemplary embodiments.

According to the exemplary embodiments of the present disclosure, it is possible to evaluate the surface state of an object even in a case where the surface of the object is not planer.

OTHER EMBODIMENTS

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-109788, which was filed on Jul. 7, 2022 and which is hereby incorporated by reference herein in its entirety.

What is claimed is:

1. An image processing apparatus comprising:
one or more memories; and
one or more processors, wherein the one or more processors and the one or more memories are configured to:
acquire image data obtained by imaging an object, wherein the image data define a captured image of an illumination image reflected on a surface of the object, wherein the illumination image is obtained by projecting linear illumination having a uniform width onto the surface of the object;
acquire a change rate of a distance between a first edge approximate line and a second edge approximate line at each position of the captured image of the illumination image;
acquire angle information about an angle at each position of the surface of the object, relative to an imaging apparatus that images the object, based on the change rate of the distance between the first edge approximate line and the second edge approximate line;
acquire, based on the captured image of the illumination image, on the first edge approximate line, on the second edge approximate line, and on the angle information, an optical profile indicating an attribute of the illumination image reflected on the surface of the object; and
evaluate a state of the surface of the object based on the optical profile.

2. The image processing apparatus according to claim 1, wherein, to acquire the optical profile, the one or more processors and the one or more memories are further configured to correct, based on the angle information, an optical profile generated based on the image data.

3. The image processing apparatus according to claim 2, wherein the one or more processors and the one or more memories are further configured to correct a sampling interval of the optical profile.

4. The image processing apparatus according to claim 1, wherein, to acquire the optical profile, the one or more processors and the one or more memories are further configured to:
   correct the image data based on the angle information; and
   acquire the optical profile based on the corrected image data.

5. The image processing apparatus according to claim 1, wherein the optical profile indicates a change in pixel value depending on each position of the surface of the object.

6. The image processing apparatus according to claim 1, wherein the one or more processors and the one or more memories are further configured to:
   acquire depth information about the object; and
   acquire the angle information about the angle at each position of the surface of the object further based on the depth information.

7. The image processing apparatus according to claim 1, wherein the one or more processors and the one or more memories are further configured to output a predetermined notification in a case where an angle between any of directions of the first and second edge approximate lines in the captured image of the illumination image and a predetermined direction exceeds a threshold.

8. The image processing apparatus according to claim 1, wherein the optical profile is luminance information about luminance on each of the first and second edge approximate lines in the captured image of the illumination image.

9. The image processing apparatus according to claim 1, wherein the optical profile is information indicating distortion of edges of the illumination image.

10. The image processing apparatus according to claim 1, wherein the one or more processors and the one or more memories are further configured to evaluate the state of the surface of the object based on a frequency characteristic of the optical profile.

11. An image processing apparatus comprising: one or more memories; and one or more processors, wherein and the one or more processors and the one or more memories are configured to: acquire image data obtained by imaging an object, wherein the image data define a captured image of an illumination image reflected on a surface of the object, wherein the illumination image is obtained by projecting linear illumination having a uniform width onto the surface of the object; store information indicating a correspondence relationship between a change rate of a width at each position of the captured image of the illumination image and a deviation angle from an angle of the surface of the object at an imaging position that directly faces the surface of the object;
   acquire, as angle information about an angle at each position of the surface of the object relative to an imaging apparatus that images the object, the deviation angle obtained from the information indicating the correspondence relationship based on the change rate of the width at each position of the captured image and on the illumination image; acquire, based on the captured image of the illumination image and on the angle information, an optical profile indicating an attribute of the illumination image reflected on the surface of the object; and evaluate a state of the surface of the object based on the optical profile.

12. An image processing method comprising:
   acquiring image data obtained by imaging an object, wherein the image data define a captured image of an illumination image reflected on a surface of the object, wherein the illumination image is obtained by projecting linear illumination having a uniform width onto the surface of the object;
   acquiring a change rate of a distance between a first edge approximate line and a second edge approximate line at each position of the captured image of the illumination image;
   acquiring angle information about an angle at each position of the surface of the object, relative to an imaging apparatus that images the object, based on the change rate of the distance between the first edge approximate line and the second edge approximate line;
   acquiring, based on the captured image of the illumination image, on the first edge approximate line, on the second edge approximate line, and on the angle information, an optical profile indicating an attribute of the illumination image reflected on the surface of the object; and
   evaluating a state of the surface of the object based on the optical profile.

13. A non-transitory computer-readable storage medium storing instructions that, when executed by a computer, cause the computer to perform an image processing method, the image processing method comprising:
   acquiring image data obtained by imaging an object, wherein the image data define a captured image of an illumination image reflected on a surface of the object, wherein the illumination image is obtained by projecting linear illumination having a uniform width onto the surface of the object;
   acquiring a change rate of a distance between a first edge approximate line and a second edge approximate line at each position of the captured image of the illumination image;
   acquiring angle information about an angle at each position of the surface of the object, relative to an imaging apparatus that images the object, based on the change rate of the distance between the first edge approximate line and the second edge approximate line;
   acquiring, based on the captured image of the illumination image, on the first edge approximate line, on the second edge approximate line, and on the angle information, an optical profile indicating an attribute of the illumination image reflected on the surface of the object; and
   evaluating a state of the surface of the object based on the optical profile.

* * * * *